Dec. 17, 1929. H. F. LESSMANN 1,739,641
PORTABLE AND ADJUSTABLE LIGHT
Original Filed Feb. 18, 1928
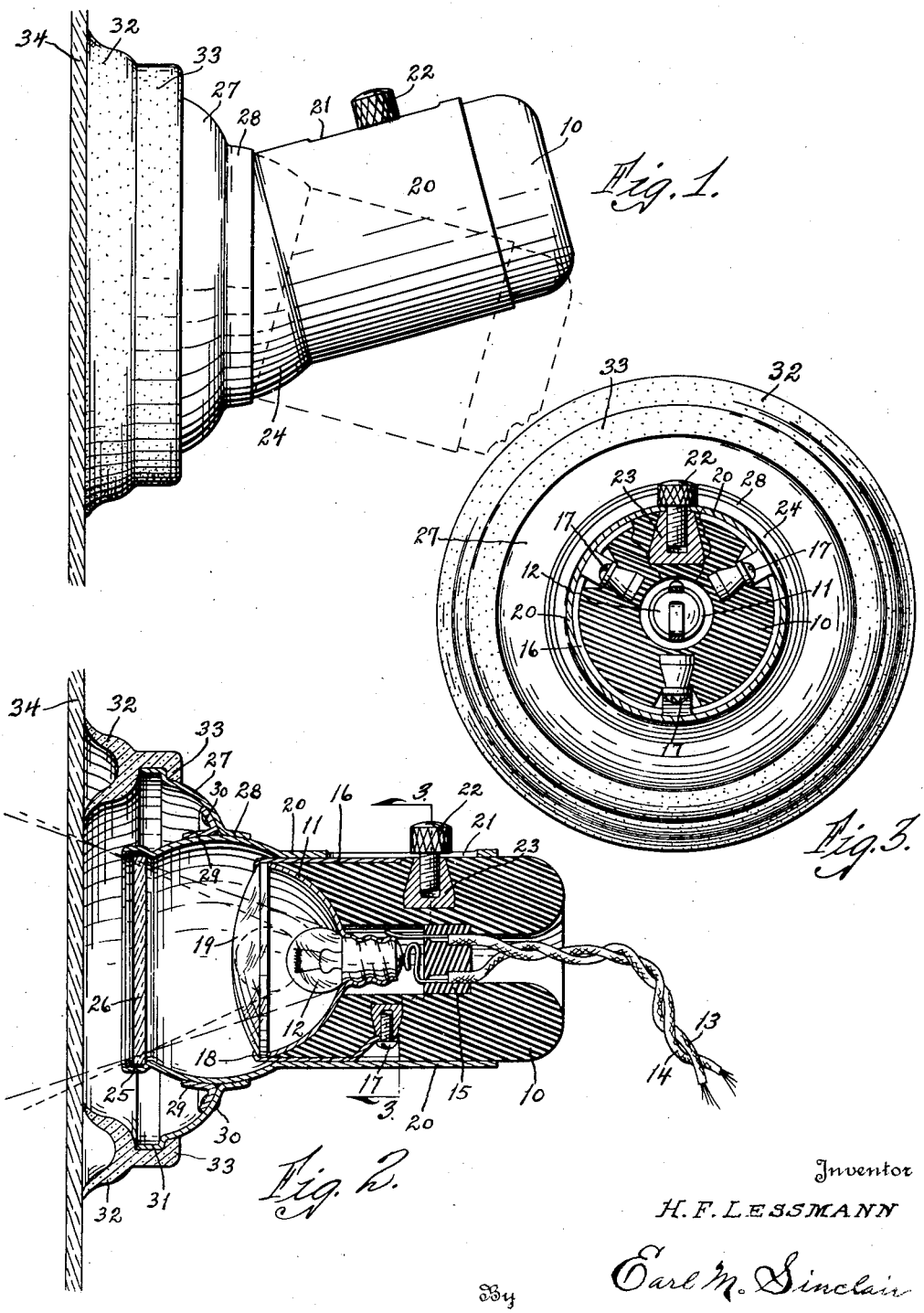
Inventor
H. F. LESSMANN
By Earl M. Sinclair
Attorney Patented Dec. 17, 1929

1,739,641

UNITED STATES PATENT OFFICE

HERBERT F. LESSMANN, OF DES MOINES, IOWA

PORTABLE AND ADJUSTABLE LIGHT

Application filed February 18, 1928, Serial No. 255,326. Renewed May 6, 1929.

The object of this invention is to provide an improved construction for a light which may be used as a spot light on a vehicle or which may be moved from place to place and employed as a trouble light and for various similar purposes.

A further object of the invention is to provide a spot light which is equipped with vacuum attaching means, whereby it may be readily attached or detached relative to the inner surface of a wind shield or other similar surface without the drilling of holes or the performance of other mechanical operations.

Still another object of the invention is to provide a light of the class described, which is formed with telescoping members so arranged that the lamp may be positioned to cause the light rays to spread out or to be focused upon a given spot.

Another object of the invention is to provide a light of the class described, which has a convenient means for pivoting the lamp carrying member and reflector so that the rays of light may be directed to the desired location.

A further object of the invention is to provide a light of the class described, which can be readily removed from its normal location for storage or for use in the making of repairs or for casting a beam of light to a position not normally accessible from the accustomed location of the device.

Still a further object of the invention is to provide a light of the class described, which may be located within a vehicle, whereby it is protected from dust, mud, snow, and other foreign substances.

With these and other objects in view, my invention consists in the construction, arrangement and combination of elements hereinafter set forth, pointed out in the claims and indicated by the accompanying drawing in which—

Fig. 1 is a side elevation showing my improved light attached to a wind shield or the like and illustrating two different positions to which the light may be pivotally adjusted.

Fig. 2 is a longitudinal section of the device, illustrating how the lamp may be telescopically adjusted to alter the spread of the rays of light.

Fig. 3 is a cross-section on the line 3—3 of Fig. 2.

In the construction of the device as shown, the numeral 10 designates a tubular base and handle member which may be formed of rubber, composition, or other suitable insulating material. At its forward end, the member 10 is formed with a concaved seat to receive a suitable reflector 11, which carries at its focal center, an electric lamp 12 which preferably is a high powered nitrogen bulb. The lamp is supplied with electric current by conductors 13 and 14 which may have their inner ends carried by a block 15 positioned within the base member 10 and which may extend through the center of said base member to any suitable source of electrical energy. Encompassing the forward end of the base member 10 is a metallic sleeve 16 which is attached to the base member by means of screws 17. The sleeve 16 projects forwardly of the base member and is formed with a peripheral flange 18 which engages the periphery of a convex lens 19 mounted at the front of the reflector 11, and by this means the lens and reflector are held in place. The sleeve 16 preferably is counter sunk in the outer wall of the base member 10, as indicated in Fig. 2.

A tubular casing 20 is slidably mounted on the base member 10 and sleeve 16 and is formed with a longitudinal slot 21 through which is mounted an adjusting screw 22 seated in the base member 10 or in an anchor block 23 carried thereby. It is the function of the screw 22 to hold the members in any position to which they may be adjusted manually. At its forward end, the tubular casing 20 is formed with an enlargement 24 which is formed on the segment of a sphere and said enlargement terminates at its forward end in a rim 25 which carries a plain lens 26 which serves as a protector for the lens 19 by preventing the accumulation of dust and other foreign substances.

I have used the numeral 27 to designate an annular supporting member which encompasses the segmental enlargement 24 and projects outwardly and forwardly from a segmental flange 28 fitted to and adapted for rolling adjustment on said segmental enlargement. Mounted within the flaring supporting member 27 is a separate ring 29 which also is formed on the segment of a sphere and is fitted to the segmental enlargement 24 and cooperates with the segmental flange 28. The segmental ring 29 is attached to the supporting member 27 by means of screws 30 which may be adjusted to regulate the tension of the members 28 and 29 on the member 24, said members 28 and 29 together forming a socket to cooperate with the ball constituted by the member 24, whereby a ball and socket joint is provided between the support 27 and the members carrying the lamp. At its forward end, the supporting member 27 is formed with an offset or shouldered flange 31 and a vacuum ring 32, or suction supporting member, formed of soft rubber or the like, is formed with a peripheral flange 33 which slips over said shouldered flange to maintain the parts in assembled relation.

In practical use the device may be supported by causing the vacuum ring 32 to engage the surface of a glass such as 34, which may be a wind shield glass or a window glass at any location in a building, but more particularly, a vehicle such as an automobile or cab. When so mounted, the lamp 12, when proper connections are made, will cause a stream of light to be projected through the lens 19, plain lens 26, and glass 34, and this stream of light may be directed by manually shifting the rear end of the base member 10 through an arc in any desired direction, the spherical enlargement 24 rolling in the spherical socket formed by the members 28 and 29 of the support.

The position of the lamp 12 may also be adjusted longitudinally of the device by loosening the screw 22 and sliding the base member 10 forwardly or rearwardly in the tubular casing 20. When the base member and lens are moved forwardly as indicated by dotted lines in Fig. 2, the rays of light are permitted to diverge and to cover a great area and when the members are withdrawn rearwardly, the rays are caused to be concentrated and may be directed toward the desired spot for greater illumination thereof.

The device may be normally located on the inner surface of the wind shield of a vehicle, and in such location it is effectively protected against the accumulation of dirt, snow, or other foreign substances which might lessen its efficiency. When desired, the device may be readily removed by detaching the vacuum cup 32 from the glass and it may be held in the hand and directed so that the rays of light will fall in the desired location for the purpose of identifying an object, for the reading of signs, locating house numbers, detecting cross roads, determining a course of travel, or for assisting in repairs or the like. It may also be located on any other desired portion of the vehicle such as a side or rear window glass, by causing the vacuum ring 32 to adhere to the inner surface of the glass; or other means may be provided for supporting the lamp on a fender or other suitable location for illuminating the side of a roadway. This device provides a portable and adjustable light which is readily removable and replaceable in almost any desired location and capable of adjustment to many positions, as before indicated. It may also be made relatively small and compact so that it can be easily stored or transported when not in actual use.

I claim as my invention:

1. A light of the class described, comprising an insulated base member, a reflector at one end of said base member, a lamp carried by said reflector, a casing on said base member formed with a segmental enlargement, a supporting member having a spherical socket engaging and rotatable on said spherical enlargement, and a vacuum ring carried by said supporting member and adapted for suction engagement with a surface and constituting the means to support the device relative to said surface.

2. A light of the class described, comprising an insulated base member, a reflector at one end of said base member, a lamp carried by said reflector, a casing slidably mounted on said base member formed with a segmental enlargement, a supporting member having a spherical socket engaging and rotatable on said spherical enlargement, and a vacuum ring carried by said supporting member and adapted for suction engagement with a surface and constituting the means to support the device relative to said surface.

3. A light of the class described, comprising an insulated base member, a reflector at one end of said base member, a lamp carried by said reflector, a casing slidably mounted on said base member formed with a segmental enlargement, a supporting member having a spherical socket engaging and rotatable on said spherical enlargement, and a vacuum ring carried by said supporting member and adapted for suction engagement with a surface and constituting the means to support the device relative to said surface, together with means for adjusting the position of said base member in said casing.

4. A light of the class described, comprising an insulated base member, a reflector at one end of said base member, a lamp carried by said reflector, a casing on said base member formed with a segmental enlargement, a supporting member having a spherical socket engaging and rotatable on said spherical enlargement, a vacuum ring carried by said supporting member and adapted for suction engagement with a surface constituting the means to support the device relative to said surface, said spherical enlargement being formed at its forward end with a rim, and a protecting lens carried by said rim.

5. A light of the class described, comprising an annular vacuum cup, said cup being formed on its rear side with an annular flange, an annular supporting member engaged by said flange, said supporting member being formed with a spherical socket at its inner periphery, a tubular casing formed with a spherical portion engaging and rotatable in said socket, a base member carried by said casing, a reflector carried by said base member, and a lamp carried by said reflector, together with a lens at the front end of said reflector.

6. A light of the class described, comprising an annular vacuum cup, said cup being formed on its rear side with an annular flange, an annular supporting member engaged by said flange, said supporting member being formed with a spherical socket at its inner periphery, said spherical socket being formed in two pieces adjustably connected, a tubular casing formed with a spherical portion engaging and rotatable in said socket, a base member carried by said casing, a reflector carried by said base member, and a lamp carried by said reflector, together with a lens at the front end of said reflector.

7. In a light of the class described, an annular base member of insulating material formed with a concaved seat at one end, a reflector mounted in said seat, a lamp carried by said reflector, a lens covering the forward end of said reflector, a sleeve mounted on said base member and formed with a peripheral flange engaging and supporting said lens, a tubular casing on said base member and sleeve, said casing projecting forwardly of said sleeve and formed with a spherical enlargement, an annular supporting ring concentrically of said enlargement and having a spherical socket adjustably engaging the outer surface of said enlargement, and an annular vacuum cup carried by said supporting member and projecting forwardly thereof.

8. In a light of the class described, an annular base member of insulating material formed with a concaved seat at one end, a reflector mounted in said seat, a lamp carried by said reflector, a lens covering the forward end of said reflector, a sleeve mounted on said base member and formed with a peripheral flange engaging and supporting said lens, a tubular casing telescopically mounted for longitudinal adjustment on said base member and sleeve, said casing projecting forwardly of said sleeve and formed with a spherical enlargement, an annular supporting ring concentrically of said enlargement and having a spherical socket adjustably engaging the outer surface of said enlargement, and an annular vacuum cup carried by said supporting member and projecting forwardly thereof.

9. A device of the class described, comprising a suction supporting member of annular shape for engagement with a surface, and a source of light arranged within the outline of said annular supporting member and adapted to project light rays through said supporting member toward said surface.

10. A device of the class described, comprising a suction supporting member of annular shape for engaging a surface, a casing carried by said supporting member, and a source of light within said casing and so arranged that rays of light therefrom will be projected through said annular supporting member.

11. A device of the class described, comprising a suction supporting member of annular shape for engaging a surface, a rigid supporting member carried by said suction supporting member, a casing having a universal pivotal connection with said rigid supporting member, and a source of light carried by said casing and so arranged that illumination therefrom will be projected through said annular supporting member.

12. A light of the class described, comprising a suction supporting member of annular form, said supporting member being formed on its rear side with an annular flange, a rigid supporting member of annular form engaged by said flange, said rigid supporting member being formed with a spherical socket, a tubular casing formed with a spherical portion engaging and rotatable in said socket, a reflector within said casing, and a lamp within said reflector.

13. A light of the class described, comprising a suction supporting member of annular form, said suction member being formed with an annular flange, a rigid supporting member of annular form engaged by said flange, said rigid supporting member being formed with a spherical socket, said spherical socket being formed in two pieces adjustably connected, a tubular casing formed with a spherical portion engaging and rotatable in said socket, a reflector within said casing, and a lamp within said reflector.

HERBERT F. LESSMANN.